United States Patent Office 3,562,241
Patented Feb. 9, 1971

3,562,241
PROCESS FOR THE PRODUCTION OF 1-OLEFIN POLYMERS HAVING INCREASED MELT INDEX
Donald R. Witt, Bartlesville, Okla., assignor to Phillips Petroleum Company, a corporation of Delaware
No Drawing. Filed Nov. 15, 1965, Ser. No. 507,673
Int. Cl. C08f 1/66
U.S. Cl. 260—94.9         3 Claims

ABSTRACT OF THE DISCLOSURE

Pretreatment of a chromium oxide polymerization catalyst with a 4–10 carbon atom-containing branched chain aliphatic olefin prior to the utilization of the catalyst for the preparation of a 1-olefin polymer and thereafter carrying out the 1-olefin polymerization in a liquid branched chain paraffin reaction medium and in the presence of hydrogen results in the production of higher melt index 1-olefin polymers.

---

This invention relates to the polymerization of olefins. In one aspect this invention relates to a method for obtaining polymers of 1-olefins having increased melt index.

Preparation of ethylene polymers and copolymers with chromium oxide-containing catalysts is disclosed in both U.S. Patent 2,825,721 and British Patent 853,414. In those patents the use of various hydrocarbon solvents or reaction media is also disclosed. Use of different solvents or reaction media chosen from among those described in the above patents results in the production of polymers having different melt indexes. As disclosed in U.S. Patent 2,891,935, it is also known to treat chromium oxide-containing catalysts with higher-boiling aliphatic olefins prior to their use in ethylene polymerization. It is also known to control polymer properties in olefin polymerization by the addition of hydrogen to the reaction system.

Since melt index is indicative of molecular weight and thus is further a measure of flow of the polymer for many purposes where complete polymer flow to fill a mold or the like is required for the formation of an article and prior to experiencing any setting of the polymer, the higher the melt index of the polymer the better it will perform. Thus, a method to obtain polymers having a high melt index is of significant value to the art.

I have now discovered in accordance with this invention that the combined use of a branched-chain paraffin reaction medium, catalyst treatment with olefin, and hydrogen results in the production of polymer having higher melt index than is obtained by use of any one of these expedients.

Thus, it is an object of the present invention to provide a method for producing polymers and copolymers of 1-olefins having an increased melt index.

Other aspects, objects and the several advantages of this invention will be apparent from the disclosure and the appending claims.

In accordance with this invention I have discovered that treatment of chromium oxide polymerization catalyst with 4 to 10 carbon atom aliphatic olefins, preferably branched, and use of that catalyst for the preparation of ethylene polymers and copolymers in a branched-chain paraffin reaction medium and in the presence of hydrogen, results in the production of higher melt index polymers than are obtained by any one expedient alone.

The treatment according to this invention is carried out by contacting the treating agent with the freshly prepared or regenerated and activated catalyst at approximately the same temperature and pressure conditions as the polymerization process itself, i.e., a temperature in the range 150 to 450° F. A preferred temperature range for the treating step is in the range 175 to 350° F. and more preferably 250 to 350° F. The pressure is preferably sufficient to maintain liquid phase conditions, i.e., in the range of about 100 to about 700 p.s.i.; however, pressures outside this range can be utilized. The time required for the treatment depends upon the temperature, the specific treating agent and the concentration of the treating solution where a solution of olefin in inert solvent is used. A treating time in the range 5 minutes to 10 hours produces satisfactory results.

The polymerization to which the present invention is applicable is the polymerization of ethylene either alone or with one or more other aliphatic olefins preferably of 3 to 8 carbon atoms. I particularly prefer 1-olefins having no branching nearer the double bond than the 4-position. In general, when ethylene is copolymerized with other olefins to produce solid polymers, the ethylene will be employed in an amount of at least 85 weight percent, preferably 90 weight percent, and in any event, will be employed in an amount to insure the formation of solid polymer. Also, it is known that larger amounts of the lower molecular weight olefins than of the higher molecular weight olefins can be employed and still obtain solid polymers. Examples of suitable comonomers include propylene, 1-butene, 2-butene, 1-pentene, 2-pentene, 1-hexene, 3-hexene, 1-octene, 4-methyl-1-pentene, 4-methyl-1-hexene, 6-methyl-1-heptene, and the like. Also, diolefins such as butadiene, isoprene and the like can be copolymerized with the ethylene.

The catalyst according to this invention can be prepared by preparation methods known in the art, e.g. direct mixing of solid components, impregnation, etc. In order to obtain optimum activity, it is preferred that the catalyst mixture comprising chromium oxide and the additional oxide as hereinbefore specified be heated under elevated temperature and for a sufficient time to activate, or increase the activity of, said catalyst for the polymerization reaction. It is also preferred that the catalyst be heated under nonreducing conditions in an atmosphere such as oxygen, air, nitrogen, carbon dioxide, helium, argon, krypton, or xenon. Reducing gases such as hydrogen or carbon monoxide can be present in said atmosphere where the time of contact with the catalyst, especially at the higher temperature, is limited to prevent extensive reduction of the hexavalent chromium; however, the presence of such gases, and of reducing agents in general, is ordinarily not desired. It is ordinarily preferred that the activation atmosphere be nonreducing. It is further preferred that the atmosphere be positively oxidizing, e.g. air or oxygen. The temperature and time of activation can vary over wide ranges and are closely interrelated (so-called "time-temperature effect"), longer times being required at lower temperatures and shorter times at higher temperatures. Catalysts prepared by milling solid silica, alumina, zirconia and/or thoria with solid oxide are activatable at lower temperatures than are catalysts prepared by impregnating silica, alumina, zirconia and/or thoria with an aqueous solution of a chromium compound. As a practical matter, a catalyst prepared by dry mixing is ordinarily activated at a temperature of at least about 350° F. and not substantially greater than about 2200° F. A catalyst prepared by impregnation with an aqueous solution is ordinarily activated at a temperature of at least about 450° F. and not substantially greater than 2200° F. Times of activation can range from about a second at the highest temperatures to 50 hours or more at the lowest temperatures. The stated numerical values are given as illustrative of the most practical ranges and are not absolute limits. By using very short times and higher temperatures, or very long times and lower temperatures, catalysts having various degrees of increased activation are obtainable.

The chromium oxide catalyst can be prepared by impregnation of particulate silica, alumina, or silica-alumina, for example, with a solution of chromium oxide or a compound convertible to chromium oxide by calcination, followed by drying and activation of the composite at a temperature in the range of 450 to 2200° F., preferably 750 to 2000° F., for a period of 3 to 10 hours or more. Activation is conducted by heating in a stream of gas. It is preferred that the gas contain oxygen and be substantially water-free. However, inert gases, such as carbon dioxide and nitrogen, can be used. Preferably the dew point of the activation gas should be below 75° F., preferably below 0° F. It is found that within this activation range of temperature treatment of the catalyst, the character of the polymer can be controlled. The catalyst can be prepared using, as starting material, chromium trioxide, chromic nitrate, chromic acetate, chromic chloride, chromic sulfate, ammonium chromate, ammonium dichromate, or other soluble salts of chromium. The highest conversions were obtained from the catalyst that contained only chromium oxides after activation. Impregnation with chromium trioxide ($CrO_3$) is preferred, although chromic nitrate can be used with similar results. It is believed that the catalyst prepared from the chloride and that prepared from the sulfate are at least partially converted to oxide during activation. The amount of chromium, as chromium oxide, in the catalyst can range from 0.1 to 10 or more weight percent and is ordinarily a minor component of the catalyst in terms of weight percent. Chromium contents as high as 50 weight percent are operative, but amounts above 10 weight percent appear to have little added advantage for the polymerization of ethylene. However, for the polymerization of propylene and higher-boiling olefins, chromium contents as high as 25 or 30 percent are often advantageous. A preferred non-chromium component or "support" is a silica-alumina composite containing a major proportion of silica and a minor proportion of alumina. While the method of preparing the silica-alumina composite undoubtedly affects the catalyst activity to some extent, it appears that silica-alumina composites prepared by any of the prior art processes for preparing such catalytically active composites are operative for the process of this invention. Coprecipitation and impregnation are examples of such processes. One support that has been found particularly effective is a coprecipitated 90 percent silica-10 percent alumina support. It is found that steam treatment of certain commercially available forms of silica-alumina or silica without appreciable alumina, improves the activity and life of the catalyst composite in a polymerization reaction. A silica support of lower surface area and larger pore size is a better support than one having extremely high surface area and small pore size. These factors are believed to be of importance in the removal of the heavy polymer from the surface of the catalyst composite. A chromium oxide-alumina catalyst ordinarily has about two-thirds the activity of a chromium oxide-silica-alumina catalyst. It is necessary for some of the chromium to be in the hexavalent state to act as an active promoter or catalyst for the polymerization reaction of this invention. It is preferred to use catalyst in which the amount of hexavalent chromium is at least 0.1 percent of the weight of the catalyst composite, at least at the initial contacting with the hydrocarbon. The hexavalent chromium is determined by ascertaining the water-soluble chromium present by leaching with water and determining the dissolved chromium in the leachings by any suitable analytical method known in the art, e.g. addition of potassium iodide solution and titration of the liberated iodine with sodium thiosulfate solution.

The preferred steam activation of certain silica-alumina bases, previously mentioned, is conducted at a temperature of approximately 1200° F. for 10 hours utilizing 5 volume percent steam admixed with 95 volume percent air. In the steam activation treatment, the temperature can be varied from 1100 to 1300° F. and the steam content of the steam-air mixture can range from about 3 to about 10 percent. The time of treatment can vary from about 4 to about 15 hours.

It is preferred that branch $C_4$–$C_{10}$ aliphatic olefins be used in catalyst treatment. Preferred olefins are isobutene, 2-methylbutene-1, 3-methylbutene-1, 3-ethylhexene-1, 2-methylnonene-1, and the like. The amount of treating olefin used is 25 to 1000 times the weight of the catalyst being treated, preferably 50 to 300. The olefin treatment of the catalyst can precede addition of the monomer or monomers being polymerized or it can be effected during the first few minutes of the reaction period—in which case the treating olefin is usually introduced just after addition of the olefin or olefins being polymerized is started. Olefin polymerization is carried out in the presence of 0.1 to 10, preferably 0.3 to 5 mols of hydrogen per 100 mols of olefinic monomer. It is preferred to add the hydrogen after the catalyst has contacted the monomer or monomers being polymerized. The branched-chain paraffin reaction medium is selected from the 4 to 8 carbon atom paraffins having at least one branch of at least one carbon atom. Examples of materials that can be used are isobutane, isopentane, neopentane, neohexane, 2,2,4-trimethylpentane, 2,2,3,3-tetramethylbutane, 3-isopropylpentane, 2,2,3-trimethylbutane, and the like.

The following examples present data which will illustrate and clarify the invention but are not intended to restrict or limit the invention unnecessarily.

EXAMPLE I

Ethylene polymers or ethylene-butene-1 copolymers were made using 0.07–0.09 g. of a chromium oxide-silica catalyst containing 1.9 weight percent chromium trioxide that was activated in dry air for 5 hours at 1300° F. The silica used was a microspheroidal material containing 0.1 weight percent alumina and having an average pore diameter of about 225 A. One- to two-hour runs were made in a 3-liter stirred reactor, using the following technique: The reactor was warmed and flushed with dry nitrogen and the chromium-oxide containing catalyst suspended in about 625 g. of reaction medium was charged. The reactor was heated to the indicated reaction temperature and ethylene was added to maintain the indicated pressure during the reaction period. When olefin treatment was used, the weight of olefin used (2-methylbutene-1) was equivalent to 100 times the catalyst weight and the olefine was added either 5–10 minutes prior to or immediately after initiation of polymerization. When hydrogen addition was used, an amount of hydrogen equivalent to 0.8–1 mol percent of the ethylene polymerized was added just after polymerization was initiated.

Data in the attached table show that use of a branched rather than a normal paraffin reaction medium results in a general elevation of melt index (Runs 1–4 versus Runs 5–8)—with the highest melt index values in both reaction media resulting from use of olefin treatment and hydrogen.

EXAMPLE II

Tests were made in the same manner as Runs 4 and 8 of Example I, except that isopentane and n-pentane were used as reaction media instead of isobutane and n-butane, and the tests were made at 350 p.s.i.g. and 220° F:

| | Reaction medium | HLMI |
|---|---|---|
| Run No.: | | |
| 9 | $isoC_5H_{12}$ | 39.7 |
| 10 | $nC_5H_{12}$ | 35.3 |

These data also show that use of an isoparaffin reaction medium together with olefin treatment of the catalyst and hydrogen addition results in the production of a higher melt index polymer.

TABLE

| | Reaction medium | Olefin treatment | Hydrogen addition | Reactor | | Polymer yield, lb./per lb. of catalyst per hr. | Properties of milled polymer | |
| | | | | Press., p.s.i.g. | Temp.; °F. | | Melt index | |
| | | | | | | | MI [1] | HLMI [2] |
| --- | --- | --- | --- | --- | --- | --- | --- | --- |
| Run No.: | | | | | | | | |
| 1 | isoC$_4$H$_{10}$ | No | No | 450 | 225 | 1,930 | 0.47 | 32.4 |
| 2 | isoC$_4$H$_{10}$ | Yes | No | 450 | 225 | 1,950 | 0.76 | 43.5 |
| 3 | isoC$_4$H$_{10}$ | No | Yes | 500 | 225 | 1,560 | 0.75 | 47.5 |
| 4 | isoC$_4$H$_{10}$ | Yes | Yes | 500 | 225 | 1,315 | 1.47 | 69.0 |
| 5 | n-C$_4$H$_{10}$ | No | No | 450 | [3] 220 | 2,340 | 0.12 | 12.5 |
| 6 | n-C$_4$H$_{10}$ | Yes | No | 450 | [3] 220 | 3,310 | 0.20 | 19.6 |
| 7 | n-C$_4$H$_{10}$ | No | Yes | 450 | [3] 220 | 1,390 | 0.38 | 24.4 |
| 8 | n-C$_4$H$_{10}$ | Yes | Yes | 450 | [3] 220 | 1,980 | 0.51 | 31.6 |

[1] ASTM D 1238-62T, Condition E.
[2] ASTM D 1238-62T, Condition F.
[3] Strict comparison with the isobutane Runs 1-4 would require operating at 225° F. However, it was not possible to operate at that temperature with normal butane because of reactor fouling.

Reasonable variations and modifications are possible within the scope of this disclosure without departing from the spirit and scope of the invention.

I claim:

1. In a process for the polymerization of 1-olefins in the presence of a chromium oxide catalyst having at least a portion of said chromium in the hexavalent state at initial contacting the improvement which comprises the steps of (a) pretreating said chromium oxide catalyst with 25 to 1000 times the weight of the catalyst being treated with a branched chain aliphatic olefin having 4 to 10 carbon atoms; (b) thereafter polymerizing at least one 1-olefin compound in the presence of the catalyst resulting from step (a) in a polymerization zone under polymerization conditions in a liquid branched-chain paraffin reaction medium and in the presence of 0.1 to 10 mols of hydrogen per 100 mols of 1-olefin; and (c) recovering the resulting polymer from said reaction zone as a product of the process.

2. A process according to claim 1 wherein ethylene is polymerized under polymerizing conditions in the presence of said chromium oxide catalyst treated with a branched aliphatic olefin selected from the group consisting of isobutene, 2-methylbutene-1, 3-methylbutene-1, 3-ethylhexene-1 and 2-methylnonene-1.

3. A process according to claim 1 wherein the polymerization is carried out in the presence of isobutane.

References Cited

UNITED STATES PATENTS

| 3,225,023 | 12/1965 | Hogan et al. | 260—94.9 |
| 2,825,721 | 3/1958 | Hogan et al. | 260—94.9 |
| 2,891,935 | 6/1959 | Lanning. | |

JAMES A. SEIDLICK, Primary Examiner

S. M. LEVIN, Assistant Examiner

U.S. Cl. X.R.

260—85.3, 88.2, 93.7